Patented June 1, 1926.

1,586,730

UNITED STATES PATENT OFFICE.

ALOIS ZINKE AND FRANZ HANSELMAYER, OF GRAZ, AUSTRIA, ASSIGNORS, BY MESNE ASSIGNMENTS, TO FELICE BENSA, OF GENOVA, ITALY.

PROCESS FOR MANUFACTURING VAT DYES.

No Drawing. Application filed February 14, 1924, Serial No. 692,884, and in Austria April 7, 1923.

Dihydroxyperylene itself possesses no particularly valuable dyeing properties. Now it was found that valuable dyes are obtained by benzoylating dihydroxyperylene by the methods already known (Dengg and Zinke, Monatshefte für Chemie volume 1922, page 128) and heating the same to higher temperatures with anhydrous aluminium chloride.

*Example.*

One part of the dibenzoate of dihydroxyperylene (prepared according to Zinke and Dengg, Monatshefte für Chemie 1922, page 128) is heated with anhydrous aluminium chloride for an hour to 160 to 200° centigrade. The molten mass obtained is boiled with dilute hydrochloric acid, the product obtained is filtered off, washed and dried. The substance is nearly insoluble in solvents having a comparatively low boiling temperature and can be recrystallized from acetone; it is obtained in dark needles with a red violet tinge and in fan-like arrangement. The colour of the solution in sulphuric acid is violet. The purification of the substance may be effected by dissolving in the sodium hydrosulphite vat with the addition of alcohol and subsequent blowing through of air. The vat is ultramarine blue, cotton after having taken up the vat shows the same colour; on hanging out in the air a beautiful blue with a slight red tinge is obtained.

It is believed that owing to the heating of the prime material with anhydrous aluminium chloride a condensation of this prime material takes place.

What is claimed is:

A process for manufacturing a vat dye consisting in heating the dibenzoate of dihydroxyperylene with anhydrous aluminium chloride to a temperature of 160° to 200° centigrade and purifying the product.

In testimony whereof we have signed our names to this specification.

ALOIS ZINKE.
FRANZ HANSELMAYER.